(12) United States Patent
Choate et al.

(10) Patent No.: US 6,362,882 B1
(45) Date of Patent: Mar. 26, 2002

(54) RETICLE PROJECTION SYSTEM FOR VIDEO INSPECTION APPARATUS

(75) Inventors: Albert G. Choate, Rush; Mehdi Araghi, Webster, both of NY (US)

(73) Assignee: Optical Gaging Products, Inc., Rochester, NY (US)

( * ) Notice: Subject to any disclaimer, the term of this patent is extended or adjusted under 35 U.S.C. 154(b) by 0 days.

(21) Appl. No.: 09/490,141

(22) Filed: Jan. 24, 2000

(51) Int. Cl.[7] ............................................... G01B 11/00
(52) U.S. Cl. ....................................................... 356/397
(58) Field of Search ............. 356/397; 250/201.1–201.3, 250/201.8, 216, 237 R, 234; 359/424, 427, 428

(56) References Cited

U.S. PATENT DOCUMENTS

| | | | | |
|---|---|---|---|---|
| 3,885,861 A | * | 5/1975 | Farnsworth et al. | 350/160 |
| 5,389,774 A | * | 2/1995 | Gelman et al. | 250/201.1 |
| 5,619,031 A | * | 4/1997 | Choate | 250/201.2 |
| 5,668,665 A | * | 9/1997 | Choate | 359/663 |

* cited by examiner

*Primary Examiner*—Frank G. Font
*Assistant Examiner*—Michael P. Stafira
(74) *Attorney, Agent, or Firm*—Shlesinger, Fitzsimmons & Shlesinger

(57) ABSTRACT

The reticle of a single magnification reticle projector mechanism of a multiple magnification video inspection apparatus may comprise a liquid crystal display (LCD) module the pixels of which are selectively energized by a conventional plug-in video card that forms part of a CPU. As the magnification setting of the apparatus is changed, the CPU causes a corresponding change in the size and spacing of the pixels that are energized. The energized pixels form clear or transparent dots on the reticle, while the remaining, unenergized pixels cause corresponding areas of the reticle to remain opaque. Alternatively the reticle is provided with a plurality of viewing areas or fields of different size, each area comprising a plurality of spaced openings or transparencies of equal size, and progressively larger fields having progressively larger openings. The reticle is mounted for lateral adjustment in the mechanism, and depending upon the selected magnification of the apparatus, the reticle is shifted either manually or under control of the CPU selectively to place the center of any one of the different fields into registry with the axial centerline of the reticle projector. In this way when the magnification is changed a corresponding change is effected in the size of the openings of the projected reticle image.

11 Claims, 1 Drawing Sheet

RETICLE PROJECTION SYSTEM FOR VIDEO INSPECTION APPARATUS

BACKGROUND OF THE INVENTION

This invention relates to multiple magnification video inspection apparatus, and more particularly to novel means for selecting one of a plurality of different pattern reticles for projection onto a workpiece that is being inspected by the apparatus. Even more particularly this invention relates to novel reticle pattern selecting means which are particularly suitable for use in connection with multiple magnification apparatus of the type which employs a single magnification reticle projector system.

Heretofore it has been common to employ in video inspection apparatus reticle projection devices which project a reticle pattern or target onto a workpiece that is being inspected. For example U.S. Pat. No. 5,619,031, which is owned by the assignee of this application, discloses multiple magnification inspection apparatus having a reticle projector system the magnification of which is adjusted simultaneously with the image of a workpiece. On the other hand, U.S. Pat. Nos. 5,668,665 and No. 5,389,774 both of which are also assigned to the assignee of the present application, disclose inspection apparatus which employ a fixed magnification reticle projector in combination with apparatus which permits a variety of magnifications of an inspected workpiece, the fixed reticle projector thus having a range of magnifications to satisfy.

Typically, reticles of the type described above comprise a transparent disc or plate having inscribed or otherwise formed thereon, or therein, a plurality of lines or spots forming a pattern which is projected onto a workpiece that is being inspected. Still other such apparatus has employed computer generated patterns or LCD (liquid crystal display) patterns which can be turned on and off electronically, but no such prior devices have been designed to have means for selecting different patterns suitable for use with different magnfications of the inspection apparatus.

Accordingly, it is an object of this invention to provide for variable magnification video inspection apparatus novel means operable to select and to project onto a workpiece a different reticle pattern each time the magnification of the image of an inspected workpiece is changed.

A more particular object of this invention is to provide for inspection apparatus of the type described a plurality of different reticle patterns at various scales which can be elected and projected onto a workpiece to satisfy different magnifications of the apparatus.

Still a further object of this invention is to provide for variable magnification video inspection apparatus a variety of reticle patterns which can be electronically or mechanically selected and projected onto a workpiece in response to variations in the magnification of the apparatus.

Other objects of the invention will be apparent hereinafter from the specification and from the recital of the appended claims, particularly when read in conjunction with the accompanying drawings.

SUMMARY OF THE INVENTION

In the reticle projector of the multiple magnification video inspection apparatus made according to one embodiment of this invention, the reticle comprises a liquid crystal display (LCD) module which is driven by a conventional plug-video card that forms part of a CPU. The CPU operates to generate signals that select the size of the pixel dots that are to be illuminated in the central viewing area of the reticle. The pixels are arranged in intersecting horizontal rows and vertical columns in the viewing area, and as the magnification setting of the apparatus is changed, the CPU can be programmed to cause a corresponding change in the size of the pixels that would be energized. The energized pixels form clear or transparent dots on the reticle, while the remaining, unenergized pixels cause corresponding areas of the reticle to remain opaque or nearly opaque. The reticle thus functions as a video monitor.

In a second embodiment the reticle is provided with a plurality of viewing areas of different size, each area comprising a plurality of small circular or rectangular openings or transparencies of equal size, the openings in each field again being arranged in spaced, parallel rows and intersecting columns. In the embodiment illustrated the reticle includes five progressively larger fields having progressively larger openings, the smallest field measuring approximately 2 by 1.5 mm., the largest field measuring approximately 132 by 24 mm., with the remaining three fields being placed adjacent to one another between the smallest and the largest fields. Depending upon the selected magnification of the apparatus, the reticle is shifted laterally of the reticle projector housing, either manually or under control of the CPU, in order selectively to place the center of any one of the five different fields into registry with the axial centerline of the reticle projector. In this way when the magnification is changed a corresponding change in the size of the openings of the projected reticle image can also be changed.

THE DRAWINGS

DESCRIPTION OF THE PREFERRED EMBODIMENTS

Figures 1, 2, 3, 4, 5:
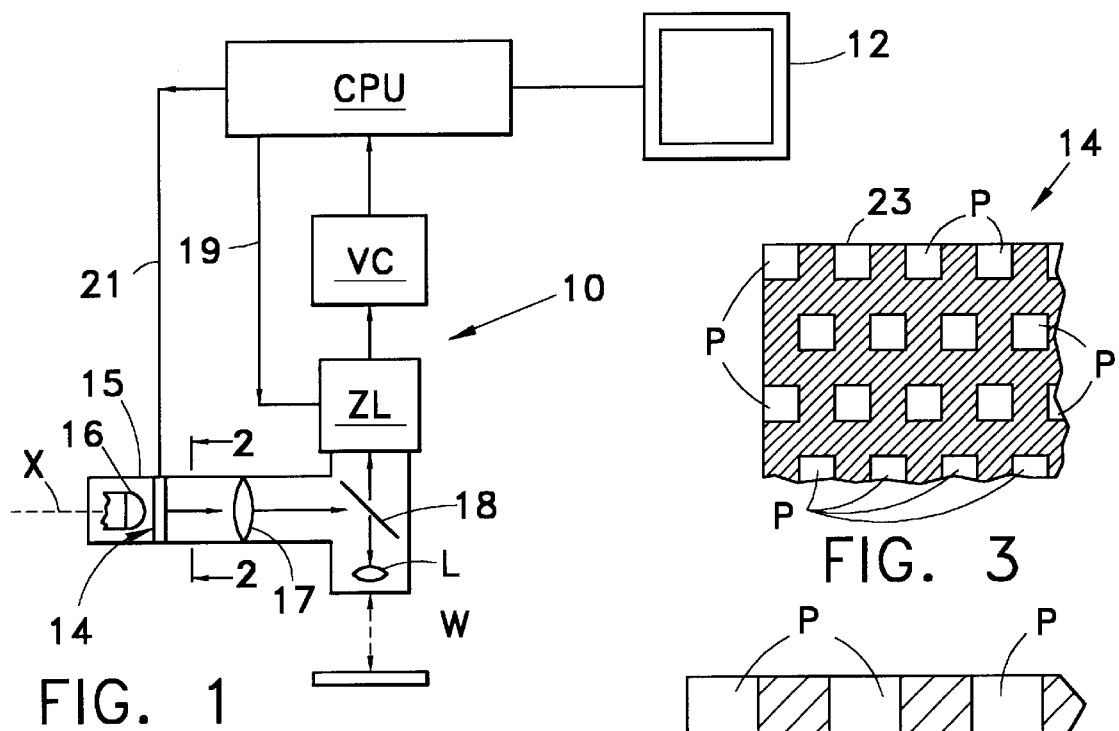
FIG. 1 is a schematic representation of the apparatus which is employed for selectively inserting different reticle patterns in inspection apparatus of the type having multiple magnification capability.
FIG. 2 is a slightly enlarged section view taken along the line 2—2 in FIG. 1 looking in the direction of the arrows, and illustrating one embodiment of the invention capable of selectively producing different reticle patterns for the reticle projector portion of the apparatus.
FIG. 3 is a fragmentary plan view of the pixel image that may be projected onto a workpiece by the reticle projector portion.
FIG. 4 is a fragmentary plan view of another pixel image that may be projected onto a workpiece.
FIG. 5 is a slightly enlarged section view generally similar to FIG. 3, but showing a modified form of a reticle that may be used with the apparatus.

Referring now to the drawings by numerals of reference, and first to the embodiment shown in FIGS. 1 and 4, 10 denotes generally video inspection apparatus comprising a conventional zoom lens assembly ZL containing an objective lens L disposed to be focused upon a workpiece W, or the like. When the workpiece is illuminated an image thereof is projected via lens L and the zoom lens assembly ZL to the image sensor (not illustrated) of a video camera VC which is mounted above and in registry with the zoom lens assembly. The output of the video camera is supplied to a microprocessor or central processing unit CPU, which is operable in known manner to project an image of the workpiece W to an associated, conventional monitor 12. The apparatus as thus far described is similar to that disclosed in the above-noted U.S. Pat. No. 5,389,774, the corresponding subject matter of which is incorporated herein by way of reference.

As in the case of the U.S. Pat. No. 5,389,774 patent, a reticle which is denoted generally by the numeral 14, and which is made according to one embodiment of this invention, is mounted in a housing 15 that projects from one side of of the zoom lens housing. Reticle 14 registers at one side thereof with a light source 16, and at its opposite side through an objective lens 17 with a beamsplitter 18, which is mounted in the zoom lens housing in a plane that extends at approximately 45° both to the zoom lens axis and the axis X of the reticle 14 and lens 17. When the light source 16 is illuminated it projects the image of the reticle 14 through the lens 17, the beamsplitter 18 and the lens L onto the work W from where the combined image of the reticle and work is projected upwardly through the zoom lens ZL and VC, and via the CPU to the monitor 12. Also as disclosed in the above-noted patent, the motor which adjusts the effective magnification of the zoom lens is controlled by a signal from the CPU, which in the embodiment illustrated is supplied by line 19 to the zoom lens.

Referring now to FIG. 2, the reticle 14 of this embodiment comprises a liquid crystal display (LCD) module or unit which is offered for sale by Hantronix Graphics. The LCD module 14 is driven by a conventional plug-in video card which forms part of the above-noted CPU, and which generates on line 21 signals that select the size of the pixel dots that are to be illuminated in the central, rectangularly shaped viewing area 23 of the reticle 14. The reticle viewing area 23 is composed of a series of small, square shaped sectors or pixels which are arranged in intersecting horizontal rows and vertical columns in the viewing area 23. The CPU is programmed to energize selected pixels of area 23 in accordance with the magnification setting of the zoom lens ZL. For example, as denoted by the letters P in FIG. 3, every other pixel in every other row thereof has been energized and thus has caused the corresponding areas of the reticle 14 to become clear or transparent, while the remaining, unenergized pixels (represented by cross hatching) cause the corresponding areas of the reticle to remain opaque or nearly opaque. In effect, therefore, the reticle 14 functions as a video monitor.

In practice the pixels can measure as small as 0.17 by 0.17 mm. In the example as shown in FIG. 3, the image created by energizing every other pixel in every other row would be particularly suitable for use with a large magnification, for example on the order of a multiple of 4 to 1. On the other hand, when the CPU denotes a smaller magnification, for example on the order of 2 to 1, then the energized pixels would be more in the form as shown in FIG. 4, wherein once again the energized pixels are denoted by the letters P, while the pixels that are not energized are indicated by cross hatching. Thus, for this magnification each energized pixel P, as well as the separating opaque areas or non-energized pixels are each four times the size of the corresponding pixels shown in FIG. 3. For smaller magnifications, of course, the size of each energized pixel P will of course be substantially larger than the pixels P as shown in FIG. 4.

While the first embodiment of this invention has been described in connection with its use with apparatus of the type disclosed in U.S. Pat. No. 5,389,774, it will be apparent to one skilled in the art that both the above described embodiment, as well as the embodiment described hereinafter, are equally suitable for use in multiple magnification apparatus of the type disclosed in the above-noted U.S. Pat. No. 5,668,665.

Referring now to the embodiment shown in FIG. 5, numeral 115 denotes a modified reticle housing which is disposed to support a reticle between a light source and a lens (not illustrated) such as for example the light source 16 and the lens 17 shown in FIG. 1. In this embodiment the opposed side walls of housing 115 have therein registering slots 116 for adjustably accommodating a different type of reticle, which is denoted generally by the numeral 114. Reticle 114 has opposed, parallel side edges 117 that are slidably guided in spaced, parallel laterally extending grooves 118 that are formed on the inside surfaces of the upper and lower wall surfaces of the housing 115 to open at opposite ends thereof on the slots 116. At one end thereof (the right end in FIG. 5) the reticle 114 is secured to one end of an elongate operating arm or bar 119, which is drivingly connected intermediate its ends to the drive shaft of a stationary, reversible electric motor 120. Motor 120 receives signals on a line 121 from a CPU, which can be programmed to drive motor 120 selectively in one direction to cause rod 119 to advance the reticle 114 toward the left in FIG. 5 relative to the housing 115, and to cause motor 120 to rotate in the opposite direction thereby causing the rod 119 to retract the reticle plate 114 backwardly or toward the right in FIG. 5. At its end remote from reticle 114 bar 119 has thereon a handle which permits reticle 114 to be shifted manually when motor 120 is not under control of the CPU.

The reticle 114 has formed therein five different, rectangularly shaped fields or viewing areas denoted by the numerals 123, 124, 125, 126 and 127, respectively. These rectangularly shaped regions or fields vary in size progressing from the smallest field 123 measuring approximately 2 by 1.5 mm. to the largest field 127, measuring approximately 132 by 24 mm. Each such field comprises a plurality of small equi-spaced circular or rectangular openings that are formed in the reticle 114, the openings in each field being arranged in spaced, parallel rows and intersecting columns, as noted in greater detail hereinafter. Also as noted hereinafter, depending upon the magnification that is selected for the associated inspection apparatus, the reticle 114 is shifted relative to the housing 115 either manually or under control of motor 120 in order to place the center of a respective one of the fields 123 through 127 selectively into registry with the axial centerline X of the associated light source and lens, such as for example the light source 16 and lens 17 as shown in the first embodiment. Also, as used above, the reference to openings in the reticle plate refer to areas or dots through which light from the light source, such as lamp 16, is permitted to pass through the reticle, the remaining portion of the plate being Opaque, or nearly so.

The following table or chart lists the magnification for which the apparatus may be set, the most desirable field 123 through 127 which would then be placed in registry with the optical axis X, listing also the size of the field and the size (diameter) of the circular openings or dots of each field.

| Magn. | Field | F. Size | Dot Size (m.m.) |
| --- | --- | --- | --- |
| ½ X | 127 | 32 × 24 mm | 0.14 |
| 1 X | 126 | 16 × 12 mm | 0.07 |
| 2 X | 125 | 8 × 6 mm | 0.035 |
| 4 X | 124 | 4 × 3 mm | 0.018 |
| 8 X | 123 | 2 × 1.5 mm | 0.009 |

As shown in FIG. 5, the reticle 114 as shown in solid lines corresponds to the position the reticle will assume when the center of the smallest field 123 registers with the axial centerline X of the reticle projector unit. In this position the handle 122 for manually manipulating reticle 114 is also shown in solid lines. On the other hand when the reticle 114 has been advanced to place the center of its largest field 127 into registry with the projector centerline X, the reticle 114 and its handle 122 will be in their extreme advanced positions as shown in phantom by the broken lines 114 and 122 in FIG. 5. Thus, depending upon the magnification selected for the apparatus, reticle 114 is shifted laterally of housing 115 into a position in which the center of at least one of its five fields 123 through 127 is positioned in registry with axis X.

From the foregoing it will be apparent that the advantage of the apparatus disclosed herein is that whenever the magnification of the video inspection apparatus is changed, as disclosed for example by the above-noted table or chart, the reticle 114 can likewise be adjusted to provide a projected reticle image having desired dot size. In a similar manner, of course, the LCD module or reticle 14, as shown in the first embodiment, can be controlled by signals from the CPU selectively to energize pixels P of different sizes, depending upon the magnification for which the associated apparatus is set. Thus, not only is the magnification of the reticle image correspondingly adjusted with the magnification of the apparatus, but with the present invention it is possible also to alter the shape of the image, and the size of the pixels or dots projected by a reticle each time that the magnification of the apparatus is changed.

While the above reticle images have been described in terms of pixels or dots arranged in intersecting rows and columns, it will be apparent that the pixels and dots could be arranged in different shapes, such as circular arrays, if desired. Also, while this invention has been illustrated and described in detail in connection with only certain embodiments thereof, it will be apparent to one skilled in the art that the invention is capable of still further modification, and that this application is intended to cover any such modifications as may fall within the scope of one skilled in the art, or the appended claims.

We claim:

1. In video inspection apparatus operable to project the combined image of a workpiece and a reticle pattern at selectively different magnifications, an improved single magnification reticle projector mechanism, comprising a housing having therein a reticle positioned between a light source and a lens, and operable to have the images of any one of a plurality of different reticle patterns projected onto a workpiece, and means operable upon the change in the magnification of the apparatus to effect a corresponding change in the image of the pattern projected by said reticle onto the workpiece.

2. Apparatus of the type defined in claim 1, wherein said means is operative electronically to change the image of the projected reticle pattern in response to the change in said magnification.

3. Apparatus as defined in claim 2, wherein said apparatus includes a CPU, said reticle comprises a liquid crystal display (LCD) module having therein spaced, signal-responsive pixels arranged in intersecting horizontal rows and vertical columns, and said pixels being selectively energized by signals from said CPU thereby to create corresponding transparent areas in said module.

4. Apparatus as defined in claim 3, wherein said pixels are rectangular in configuration.

5. Apparatus as defined in claim 4, wherein the number of pixels energized by said CPU increases as said magnification decreases, and vice versa.

6. Apparatus as defined in claim 1, wherein said means comprises means mounting said reticle in said housing for adjustment relative thereto into different operating positions in each of which the projected image of said reticle pattern differs from the image projected by said reticle in each of the other operating positions thereof.

7. Apparatus as defined in claim 6, wherein said reticle has thereon a plurality of different viewing areas each corresponding, respectively, to a different one of said operating positions, and each of said viewing areas is disposed to have the center thereof positioned in registry with the center of said light source when said reticle has been adjusted into the corresponding operating position of a respective viewing area.

8. Apparatus as defined in claim 7, wherein said viewing areas are different in size, and each of said areas encompasses a plurality of equi-spaced light transmissive areas in said reticle.

9. Apparatus as defined in claim 8, wherein each of said viewing areas is rectangular in configuration, and said light-transmissive areas in each of said viewing areas are arranged in a pattern of intersecting horizontal rows and vertical columns.

10. Apparatus as defined in claim 9, wherein said viewing areas range in size from 2 mm. by 1.5 mm. for a magnification of 8X, to 32 mm. by 24 mm. for a magnification of ½X, and said light-transmissive areas range in size from 0.009 mm. to 0.14 mm.

11. Apparatus as defined in claim 1, wherein said means includes a CPU, said reticle comprises a liquid crystal display (LCD) module connected to said CPU and having a normally opaque image forming surface extending transversely of the axis of said light source, said surface has therein spaced pixels disposed to be selectively energized by signals from said CPU, and said pixels, when energized form spaced transparent areas in said image forming surface.

* * * * *